June 1, 1943.  C. F. HENNEY  2,320,596
REFRIGERATING APPARATUS
Filed Jan. 26, 1940  2 Sheets-Sheet 1
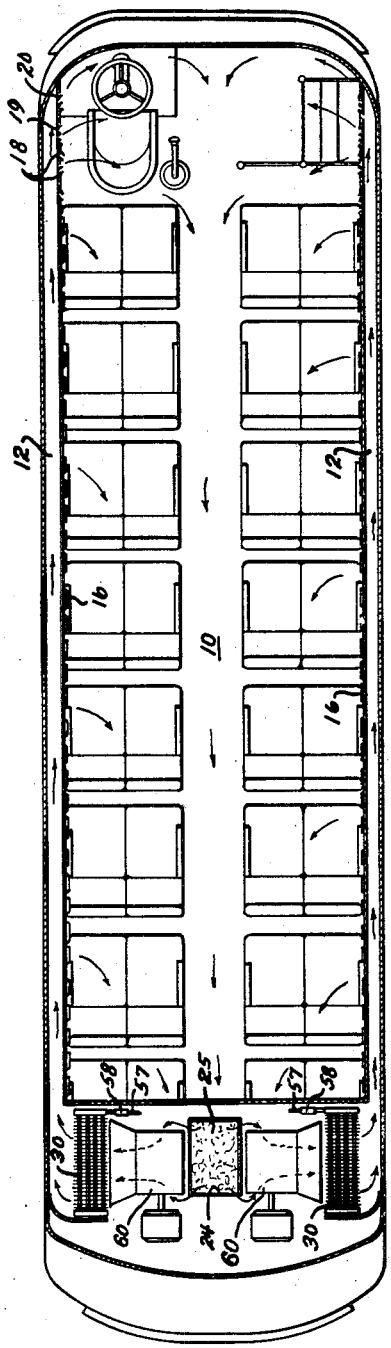
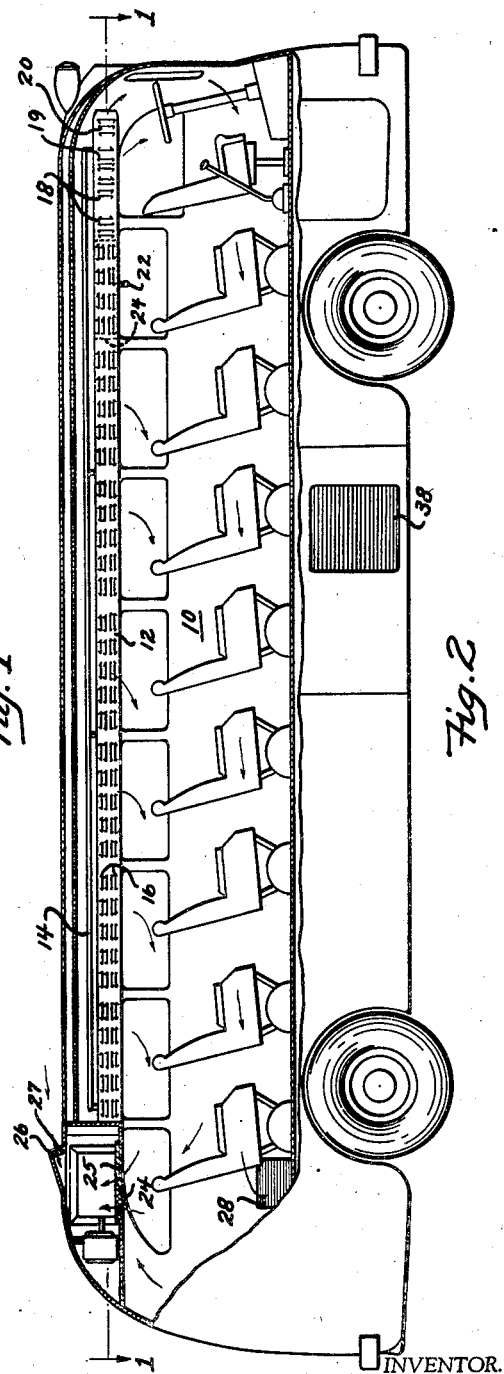
INVENTOR.
Charles F. Henney
BY Spencer, Hardman & Fehr
ATTORNEYS June 1, 1943.  C. F. HENNEY  2,320,596
REFRIGERATING APPARATUS
Filed Jan. 26, 1940    2 Sheets-Sheet 2
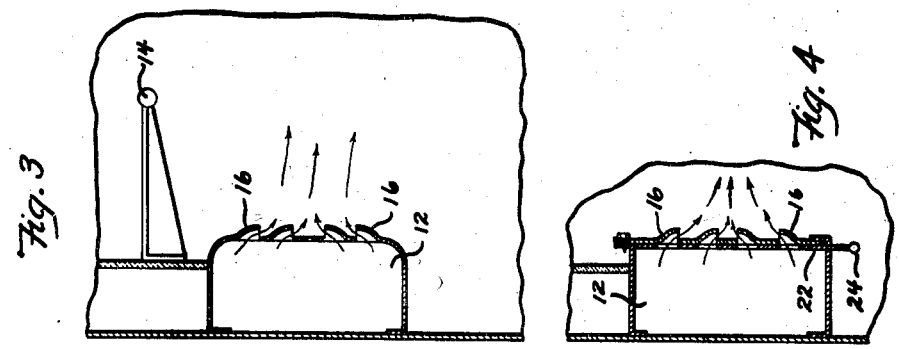
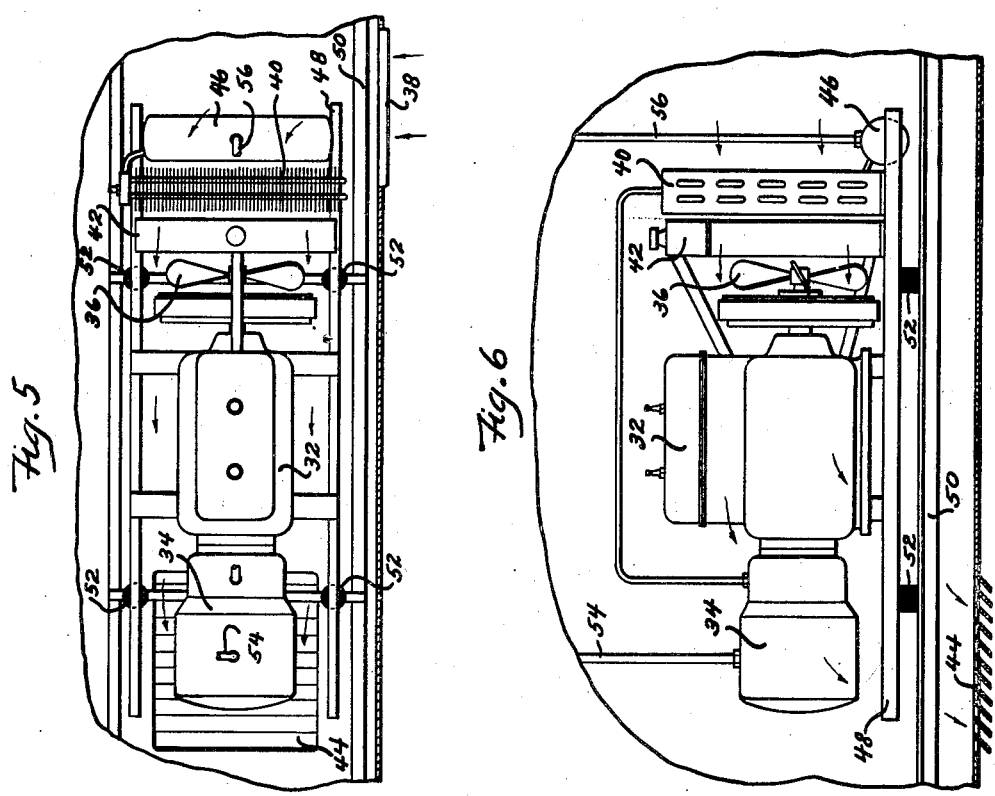
INVENTOR.
Charles F. Henney
BY Spencer, Hardman & Fehr
ATTORNEYS Patented June 1, 1943

2,320,596

UNITED STATES PATENT OFFICE 2,320,596

REFRIGERATING APPARATUS

Charles F. Henney, Dayton, Ohio, assignor to General Motors Corporation, Dayton, Ohio, a corporation of Delaware Application January 26, 1940, Serial No. 315,845

1 Claim. (Cl. 98—10)

This invention relates to refrigerating apparatus and more particularly to apparatus for conditioning air for human comfort.

One object of this invention is to provide simplified means for cooling and distributing the air for an enclosure.

Still another object of this invention is to provide an improved air grille.

Still another object of this invention is to provide an inexpensive air distributing duct.

Further objects and advantages of the present invention will be apparent from the following description, reference being had to the accompanying drawings, wherein a preferred form of the present invention is clearly shown.

In the drawings:

Fig. 1 is a horizontal sectional view taken on line 1—1 of Fig. 2;

Fig. 2 is an elevational view with parts broken away so as to show the arrangement of the louvers in the air duct wall;

Fig. 3 is a fragmentary sectional view showing one air duct construction;

Fig. 4 is a similar fragmentary sectional view showing a modified form of air duct construction;

Fig. 5 is a plan view of the refrigerant liquefying mechanism; and

Fig. 6 is an elevational view of the refrigerant liquefying unit.

In designing air conditioning apparatus for use on a passenger bus or other type of passenger vehicle it is very essential to keep the weight as well as the cost of the air conditioning apparatus at a minimum. With this in mind, I have provided an air conditioning system which is not only light in weight and economical to manufacture but also functions in a new and improved manner. While I have shown my invention applied to a bus it is obvious that it has many other applications. In the application shown in Fig. 1, the conditioned air enters the passenger compartment 10 of the bus through oppositely arranged ducts 12 extending substantially the full length of the bus directly beneath the luggage racks 14. In order to avoid discharging the air into the passenger compartment in the form of large slow moving blasts of air which rapidly move downwardly onto the passengers, the vertical wall of each duct is provided with a large number of louvers 16 which are arranged to discharge the air in the form of small but fast moving streams of air. As best shown in Figs. 1 and 2, most of these louvers are arranged in sets which, as shown in Figs. 3 and 4, cause the conditioned air to be discharged in the form of converging streams of air forming horizontally directed jets of air. By virtue of this jet arrangement the cold air travels toward the center of the car before dropping and also has an aspirator effect which causes air from the passenger compartment to be drawn upwardly into the fast moving air forming the jet so as to mix with the cool air before descending into the occupied space or the center aisle.

Adjacent the driver's compartment of the bus, the louver openings are arranged vertically as shown in Figs. 1 and 2 and are so grouped as to cause an even distribution of the conditioned air in the front end of the bus. Thus, as shown in Figs. 1 and 2 the louvers which have been designated by the reference character 18 are so arranged as to discharge the air directly towards the center of the bus, whereas the louvers designated by the reference character 19 are so arranged as to cause the air to flow more towards the front of the bus and the louvers 20 are all facing towards the front of the bus whereby a portion of the conditioned air is caused to sweep the front end of the bus. It is apparent, therefore, that by properly arranging the louvers in a single group, the direction of the air flow can be controlled.

Inasmuch as it frequently happens that some people do not like as much conditioned air as others, it is within the purview of this invention to provide dampers such as damper 22 shown in Figs. 2 and 4 whereby a predetermined number of louvers may be closed. In order to operate the damper, a manual operator 24 may be provided which projects downwardly from the air duct. Only one damper has been shown in Fig. 2, whereas additional dampers may be provided if desired. For purposes of illustration the damper 22 has been shown as capable of closing all of the louvers above the one seat. These dampers may, however, be designed so as to close only the upper louvers if desired.

The ducts may be constructed either as shown in Fig. 3 or as shown in Fig. 4. The air grille for each side may be made as a single long piece or in the form of a plurality of shorter sections. The air returns to the cooling compartment through the return air opening 24 arranged in the ceiling of the bus adjacent the rear of the passenger compartment. By virtue of this arrangement, the conditioned air does not strike the passengers from the rear but tends to flow from the front to the back with a main flow of return air taking place in the unoccupied central section of the bus.

The necessary amount of fresh outside air may be introduced through a fresh air inlet such as the inlet 26 provided adjacent the top of the bus as shown in Fig. 2. Filters 25 and 27 are provided adjacent the inlets 24 and 26 respectively. Inasmuch as a certain amount of fresh air is normally introduced into the passenger compartment, some of the air from the passenger compartment must discharge to the outside. This air may leave through the discharge opening 28 provided in the side wall of the bus at the rear of the passenger compartment as shown in Fig. 2.

The evaporators 30 for cooling the air are placed adjacent the ceiling of the bus at the rear of the bus directly at the inlets of the air distributing ducts 12. While I have shown two evaporators, one for each duct, it is obvious that a single evaporator arranged adjacent the opening 24 may be used for conditioning the air prior to its discharge into the ducts 12.

The refrigerant liquefying means which supplies liquid refrigerant to the evaporators is mounted beneath the floor of the passenger compartment adjacent the side of the bus and may be arranged as shown in Figs. 5 and 6. The refrigerant liquefying unit comprises an internal combustion engine 32, a compressor 34 directly connected to the internal combustion engine and an air circulating fan 36 which draws air in through the inlet opening 38 in the side of the bus and circulates the air over the refrigerant condenser 40, the engine radiator 42, the engine 32, the compressor 34 and discharges the air through the outlet 44 provided in the bottom wall of the bus. The refrigerant liquefying units including the receiver 46 are all supported on a main frame 48 which is resiliently mounted on the bus frame 50 by means of the rubber-like mountings 52. The vaporized refrigerant from the evaporators enters the compressor through the vapor line 54 and liquefied refrigerant is supplied to the evaporators through the liquid line 56 which connects with the branch lines 57 leading to the evaporators. The flow of refrigerant to the evaporators is controlled by the fixed restrictors 58. These restrictors may be designed to supply the same amount of refrigerant to each evaporator or to supply a larger quantity to the one than to the other so as to compensate for any difference in the conditioning load on the two sides.

The blowers 60 which are of conventional design are arranged so as to circulate the air to be cooled over the evaporators 30 and into the air distributing ducts as shown in Fig. 1.

The refrigerating apparatus may be provided with any conventional controls whereby the effective temperature in the passenger compartment may be maintained within the comfort range.

While the form of embodiment of the invention as herein disclosed, constitutes a preferred form, it is to be understood that other forms might be adopted, all coming within the scope of the claim which follows.

What is claimed is as follows:

In combination with a vehicle having a relatively long narrow passenger compartment, evaporator means adjacent the upper rear corner of said compartment, means for flowing air to be conditioned in thermal exchange relationship with said evaporator means, means for distributing the conditioned air within the passenger compartment comprising a pair of air distributing means arranged along opposite sides of said passenger compartment, each of said distributing means comprising an air distributing chamber extending along one side of said compartment for substantially the full length of said compartment and having the one side thereof provided with stamped sheet metal air grille means extending substantially the full length of said chamber, said air grille means being provided with integrally formed oppositely disposed air deflecting louvers for directing converging streams of air outwardly towards the center of the bus, certain of said louvers adjacent the front end of said compartment being arranged to direct air forwardly along the front wall of said compartment, a return air grille adjacent the rear of said passenger compartment through which air returns to said evaporator, and refrigerant liquefying means for supplying liquid refrigerant to said evaporator means.

CHARLES F. HENNEY.